June 24, 1941.   W. ANSCOTT ET AL   2,247,142
GYROSCOPE CAGING AND ERECTING MEANS
Original Filed Nov. 30, 1937   3 Sheets-Sheet 3
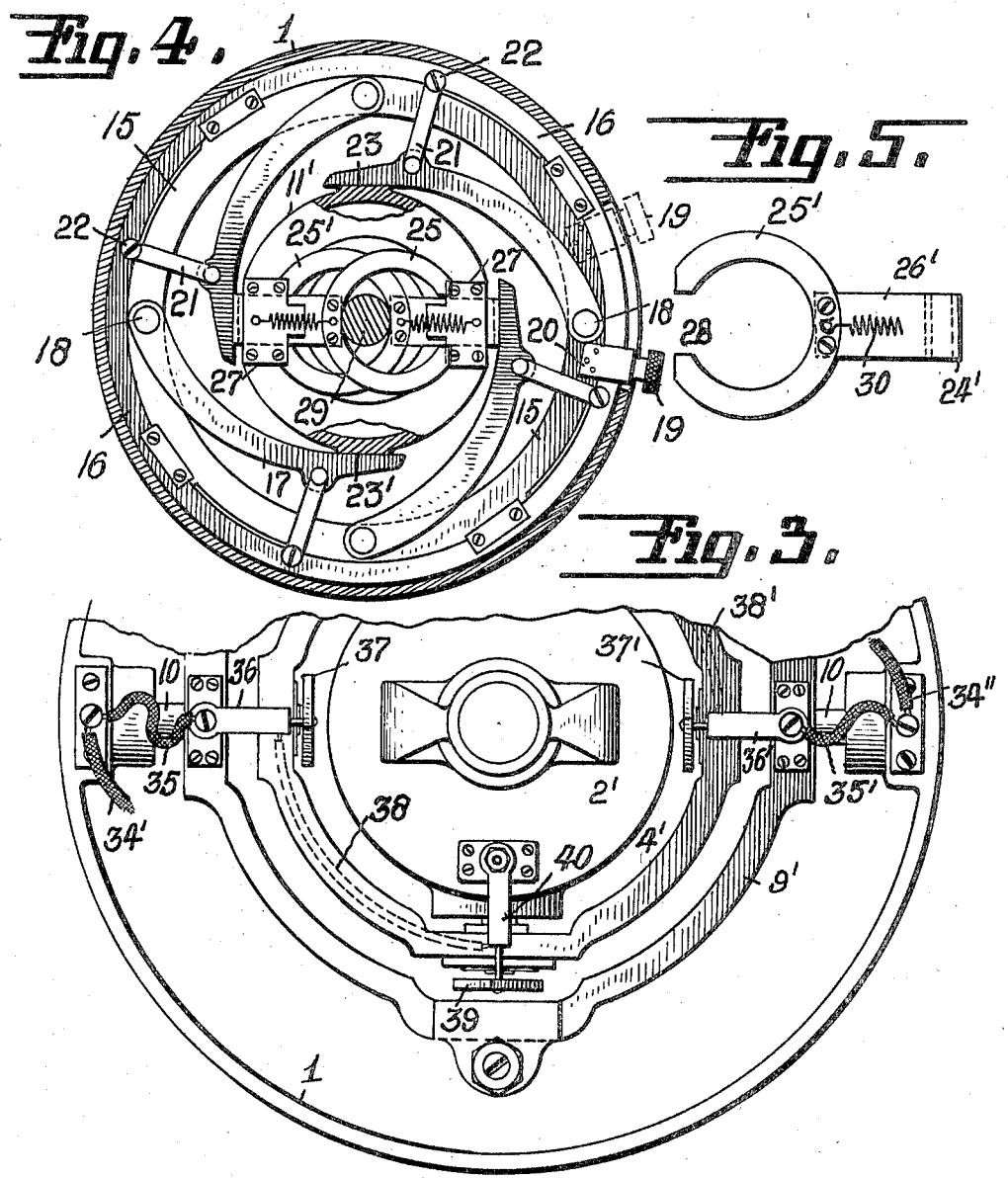
INVENTORS
WILLIAM ANSCOTT
ORLAND E. ESVAL
BY
THEIR ATTORNEY.

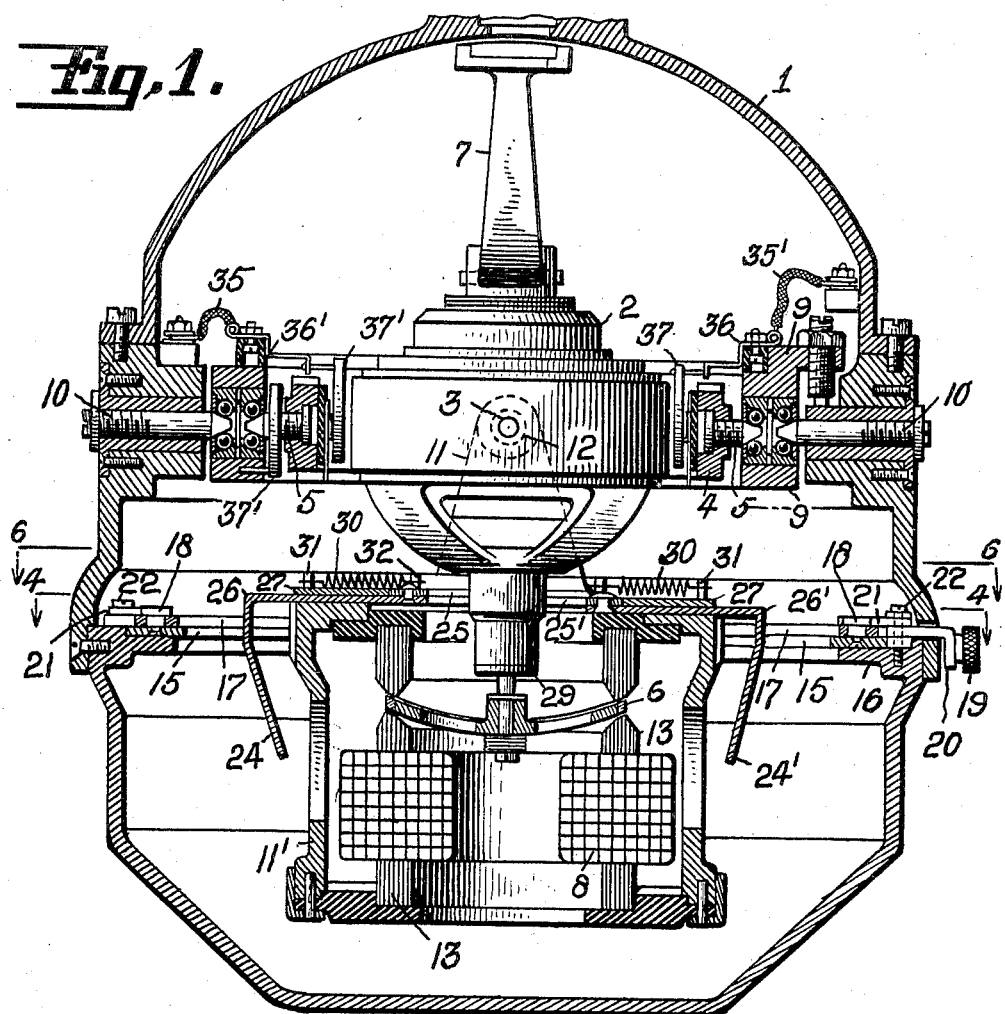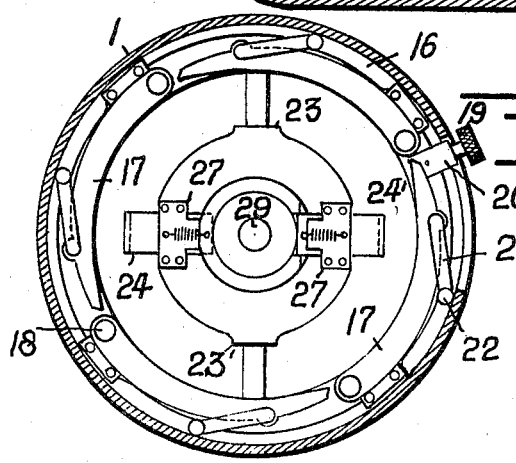

Patented June 24, 1941

2,247,142

UNITED STATES PATENT OFFICE 2,247,142

GYROSCOPE CAGING AND ERECTING MEANS

William Anscott, Woodhaven, N. Y., and Orland E. Esval, Allendale, N. J., assignors to Sperry Gyroscope Company, Inc., Brooklyn, N. Y., a corporation of New York Application November 30, 1937, Serial No. 177,178
Renewed May 23, 1940

11 Claims. (Cl. 74—5)

This invention relates, generally, to gyroscopes such as those employed for providing an artificial horizon or an artificial vertical for aircraft or other dirigible craft, and the invention has reference, more particularly, to novel improvements in caging and erecting means for gyroscopes of the above character.

In the copending application of Orland E. Esval, one of the joint applicants herein, and Carl A. Frische, now Patent No. 2,229,645, dated January 28, 1941, there is disclosed a novel electromagnetically operable means for erecting or positioning gyroscopes, the said means comprising essentially a winding member for producing a moving magnetic flux field cooperating with a coupled inductive member, one of said members being connected to the gyro rotor casing and the other of the members being pendulously supported, the tilting of the gyro rotor from the desired position causing an electromagnetic force to be exerted between the two said members and acting to precess the gyro rotor back to its desired position.

In use, it is necessary to cage the gyro and the pendulous member in order to prevent objectionable or even destructive gyrations or oscillations of the gyroscope as well as undue swinging of the pendulous member during starting and stopping of the gyro motor, especially when the apparatus is used on a moving vehicle, such as an aircraft or ship.

The principal object of the present invention is to provide in a gyroscope of the above type, caging means operable for simultaneously caging the gyro rotor casing and the pendulous member to thereby prevent gyrations or oscillations of the gyroscope and cooperating pendulous member during starting and stopping of the gyro rotor.

Another object of the present invention lies in the provision of a novel improved gyroscope of the above character, using taps on the armature of the gyroscope rotor D. C. driving motor for supplying three phase current to the winding of the electromagnetic means, thereby eliminating the necessity of an A. C. source and of bringing a third lead into the gyroscope from without.

Still another object of the present invention is to provide novel improvements in gyroscopes of the above character, comprising the use of novel means for supplying current to the gyro rotor driving motor without passing such current through the gimbal bearings of the gyroscope, thereby eliminating the pitting and injuring of such bearings which would occur, were current allowed to pass therethrough.

Other objects and advantages will become apparent from the specification, taken in connection with the accompanying drawings wherein the invention is embodied in concrete form.

In the drawings,

Fig. 1 is a vertical, part sectional view showing a gyroscope provided with the novel improved caging means of the present invention.

Fig. 3 is an enlarged, fragmentary, transverse view of the gyroscope of Fig. 2, with the exterior casing half removed.

Fig. 4 is a reduced sectional view, taken along line 4—4 of Fig. 1, but showing the caging fingers in their projected locking positions.

Fig. 5 is a plan view of the clamping jaw employed in the caging means.

Fig. 6 is a reduced sectional view taken along line 6—6 of Fig. 1.

Similar characters of reference are used in all of the above figures to indicate corresponding parts.

Figure 2:
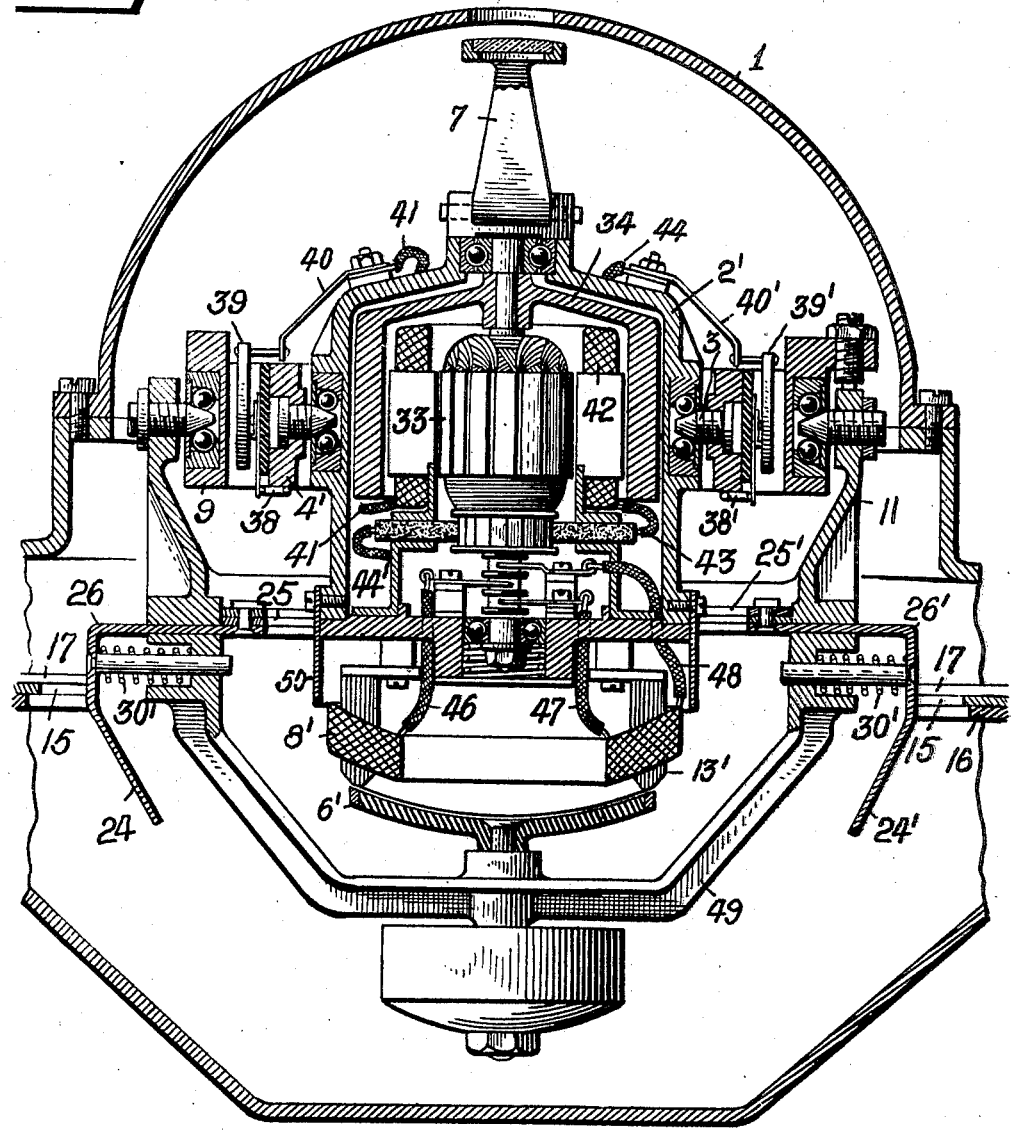
Fig. 2 is a vertical sectional view of a gyroscope provided with a D. C. drive motor and the novel caging and erecting means of the present invention.

Referring now to Figs. 1, 4, 5 and 6, the reference numeral 1 designates an instrument housing which, for purposes of illustration, is shown as the housing of a gyro sextant, although the invention is applicable to any type of gyroscope employed for providing an artificial horizon or an artificial vertical. Within the housing 1 there is contained a gyroscope bearing casing 2 having a gyroscope rotor rotatable therein about a vertical axis, the said gyroscope being ordinarily electrically driven in a manner well known to those skilled in the art, although other drive means may be used. The casing 2 is universally mounted about horizontal axes by providing the rotor bearing casing with horizontal pivots, one of which is shown at 3, rotatably mounted preferably by means of anti-friction bearings in a gimbal ring 4 which, in turn, is similarly mounted for oscillation or rotation about horizontal pivots 5 at right angles to the pivots 3.

In the form of the invention shown in Fig. 1, an inductor 6, having the form of an annular ring of electrically conducting though non-magnetic material, such as copper, is suspended from the lower stem portion 29 of the gyro casing 2, as in the manner disclosed in the aforementioned application. The gyro casing 2 and its enclosed rotor, together with any means supported thereby, such as the reticle arm 7 and the depending inductor 6, are preferably substantially balanced about both horizontal axes about which casing 2 is universally mounted, i. e., the center of gravity of casing 2 and its contents, together with members 6 and 7 supported thereon, lies preferably at the point of intersection of the axes passing through pivots 3 and 5. A slight amount of pendulousness may be employed to correct for errors due to friction in the trunnions, but appreciable pendulosity of the gyro is undesirable, particularly when the device is to be used for aircraft, since in operation, during the turning or other maneuvering of the craft giving rise to acceleration forces, an oscillation of the gyro pendulum is apt to be set up which is obviously undesirable. Therefore it is preferable to employ a substantially non-pendulous gyroscope and to impart gravitational control thereto by means of the magnetic flux field supplied from stator winding 8 and acting on inductor 6, thereby directly reducing any inclination of the gyro without setting up oscillations.

The pivots 5 are carried by a gimbal ring 9 that in turn is pivotally supported by pivots 10 carried by the instrument housing 1, the axis of the pivots 5 being shown coincident with that of pivots 10. A dependent U-shaped frame member 11 having a central substantially cylindrical portion 11' is pivoted on pivots 12 carried by ring 9 and aligned with pivots 3, in a similar way as shown for the members 11 and 9 in Fig. 2. The frame member 11' carries a laminated stator ring 13 provided with winding slots for accommodating the three phase stator winding 8, this winding being wound similarly to an induction motor stator, as disclosed in the aforementioned application.

Since the stator member, consisting of winding 8 and ring 13, is supported pendulously by frame 11 on the same gimbal axis as the gyroscope, but independently of the latter, the same, due to its weight, is normally positioned with the central axis vertical, the stator producing a rotating magnetic field cooperating with the inductor member 6 to apply an erecting force upon the gyroscope casing 2 in the event that the same should tilt from the vertical, this force being applied at right angles to the direction of tilt and hence serving to precess the gyro directly to the vertical. By varying the magnitude of the current in the winding 8, the precessing force of course may be correspondingly varied to thereby determine the time of precession, as desired, the period of precession being relatively long in comparison to the movement of the pendulum 11, resulting from accelerating forces such as those occurring during aircraft operation, whereby the gyro is substantially unaffected by such accelerating forces.

The structure so far described is similar to that disclosed in the above mentioned application.

In order to provide for the caging of the gyro casing 2 and the pendulous member 11 carrying the stator 8, 13, novel caging means is provided, comprising a turnable, horizontal ring member 15 that is supported by an internal annular flange 16 fixed to the inner wall of housing 1. Ring member 15 is adapted to be turned through a partial revolution by means of a knob 19 positioned outside of housing 1 and having a supporting stem 20 extending through a slot in the side wall of the housing and connected, as by rivets, to the ring member 15. Thus, by moving the knob 19 from the full line to the dotted line position shown in Fig. 4, the ring member is adapted to be turned through a corresponding angle.

Ring member 15 carries a plurality of angularly spaced, curved caging fingers 17 that are pivoted at corresponding end portions upon this ring member, as by pins 18, the other end portions of these caging fingers being connected by links 21 to screws 22 fixed upon the flange member 16. As thusly constructed, when the knob 19 is in the dotted line position shown in Fig. 4, corresponding to its position shown in Fig. 6, the caging fingers 17 are in their outer retracted positions shown, overlying the ring member 15, in which positions the fingers do not interfere with the free movement of the gyroscope or pendulous frame member 11. This is also illustrated in Fig. 1. However, when the knob 19 is moved from the dotted line to its full line position shown in Fig. 4, the ring member 15 serves to move the pins 18 clockwise about the gyro vertical axis, thereby causing the inner end portions of caging fingers 17 to swing inwardly due to the oscillation of links 21 about their fixed pivots 22, whereby the inner end portions of the caging fingers are moved inwardly into cooperative locking engagement with the frame member 11'.

The substantially cylindrical portion 11' of frame member 11 is provided with diametrically opposite flats 23 and 23' adapted to be engaged by two of the fingers 17, whereas the remaining two fingers are adapted to engage depending, somewhat inclined shank end portions 24, 24' provided on diametrically oppositely arranged clamping jaws 25, 25' disposed at right angles to flats 23, 23'. The shanks of jaws 25 and 25' have horizontal portions 26 and 26' which are readily slidable in guide plates 27 fixed upon the upper surfaces of the hollow, cylindrical portion 11' of frame 11. The C-shaped jaw portions of clamping jaws 25 and 25' overlap each other, as especially shown in Fig. 4, these jaws having open mouths 28 so that the same may receive the depending stem portion 29 of casing 2.

Coil tension springs 30 have their outer ends respectively connected to pins 31 carried by guides 27, and their inner ends connected to pins 32 fixed to the clamping jaws, whereby these jaws are normally withheld from engaging the gyro casing stem 29, the rear portion of the jaws being held by these springs in abutting relation with their respective guides 27, as shown in Figs. 1 and 6. However, when the diametrically opposed caging fingers 17 engage and press against the depending shank end portions 24 and 24', as shown in Fig. 4, the clamping jaws are moved radially inwardly so as to engage opposite sides of the stem 29, this engagement taking place simultaneously with the engagement of the remaining caging fingers with the flats 23 of the pendulous member 11.

Thus, the inward movement of the caging fingers not only serves to engage and lock the pendulous member 11 against turning, but also, by engaging and actuating the clamping jaws 25, 25', these fingers serve to also lock the gyro casing in central position within the housing 1. As a matter of fact, since the pendulous member is pivoted on pivots 12 extending at right angles to the clamping jaws, the engagement of the fingers 17 upon the shanks 24 and 24' and the movement of these shanks inwardly into their innermost positions serves to lock the pendulous member as well as the gyro casing against movement, regardless of whether or not the remaining caging fingers engage the flats 23, 23'. In other words, the upper and lower caging fingers 17 shown in Fig. 4 and engaging flats 23 and 23' could be omitted, if desired.

Owing to the use of the depending shank end portions 24, 24' on the clamping jaws, these jaws are engaged and actuated to locked position by the caging fingers 17 regardless of the inclination of the pendulous member 11.

The motor used within casing 2 for driving the gyro rotor may be of the A. C. three phase type, similar to that disclosed by one of the applicants herein, i. e., Orland E. Esval, in Patent No. 2,193,531, dated March 12, 1940, the three phase motor current supply also being used to supply the three phase pendulous stator winding 8 producing the rotating flux field acting on inductor 6.

In use, by simply moving the knob 19 from the dotted line position shown in Fig. 4 to the full line position, the fingers 17, cooperating with clamping jaws 25, 25', serve to simultaneously lock both the pendulous member 11 and the gyro casing 2 against movement, thereby facilitating easy starting and stopping of the gyro and preventing dangerous gyrations or oscillations thereof.

In the structure of Figs. 2 and 3, a D. C. motor is employed for driving the gyro rotor, this motor being illustrated as of the series type. The gyro rotor 34 is fixed upon the shaft of the motor armature 33 for rotating therewith within bearing casing 2'. Current for this motor is supplied from D. C. supply leads 34', 34'' (see Fig. 3) through jumpers 35, 35', clips 36, 36' carried by gimbal ring 9', spiral spring conductors 37, 37' carried by gimbal ring 4', leads 38, 38' on this gimbal ring to spiral spring conductors 39, 39' and clips 40, 40' to the rotor bearing casing 2'. The spiral spring conductors 37, 37' and 39, 39' provide for free relative movement of the gimbal rings and rotor bearing casing. Clip 40 is connected through lead 41 to motor field winding 42, while this winding is connected by jumper 43 to one motor brush, the other brush being connected by lead 44 to clip 40'. Thus, an unbroken, continuous connection is provided for supplying current from supply leads 34', 34'' to the motor 33–42, which connection does not interfere with the free movement of the casing 2' or depending U-shaped frame member 49 and does not employ the gimbal rotor bearings as a part thereof, thereby eliminating pitting and injuring such bearings.

Three 120° taps are taken off the winding of motor armature 33 and connected to slip rings that are engaged by brushes shown connected to leads 46, 47 and 48 feeding the stator winding 8'. This winding and stator ring 13' are shown in Fig. 2 as carried by the gyro casing 2' instead of by the pendulous member 11, as in Fig. 1. The pendulous or U-shaped frame member 49 is shown in Fig. 2 as carrying the inductor 6'. This arrangement enables the supply of three phase A. C. to the stator winding 8 for erecting the gyroscope while using a D. C. supply source, the use of such a supply eliminating the necessity of bringing in a third external lead to the gyro drive motor and stator 8'.

The caging means employed for locking the rotor casing 2' and U-shaped depending frame member 49 of Figs 2 and 3 is similar to that shown in the remaining figures and similar parts are similarly numbered. Instead of using tension springs 30 for parts urging the clamping jaws 25, 25' apart, however, compression springs 30' are employed, the jaws 25, 25' being shown as adapted to engage an apron 50 provided on the lower portion of rotor casing 2'.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscope having a spinning rotor, a bearing casing for said rotor universally mounted on gimbal rings, a pendulous member extending adjacent said bearing casing, electromagnetic means having parts thereof carried by said casing and said pendulous member for erecting said gyroscope, and means for simultaneously caging said bearing casing and said pendulous member.

2. In a gyroscope having a spinning rotor, a bearing casing for said rotor universally mounted on gimbal rings, a pendulous member extending beneath said bearing casing, electromagnetic means having parts thereof carried by said casing and said pendulous member for erecting said gyroscope, and means for simultaneously caging said bearing casing and said pendulous member, said caging means comprising externally operable caging fingers, and clamping jaws carried by said pendulous member and engagable by said caging fingers for locking said bearing casing.

3. In a device of the character described, a gyroscope having a rotor arranged for turning about a vertical axis, a motor for driving said rotor, electrical means acting upon the tilting of said gyroscope rotor, to effect the precession of the same back to the vertical, said electrical means comprising a winding member, an inductor member associated therewith, and taps extending from said motor for supplying said winding member with alternating current whereby the latter is caused to produce a moving magnetic field for cutting said inductor member.

4. In a device of the character described, a gyroscope having a rotor arranged for turning about a vertical axis, a motor for driving said rotor, electrical means acting upon the tilting of said gyroscope rotor, to effect the precession of the same back to the vertical, said electrical means comprising a winding member, an inductor member associated therewith, and taps extending from said motor for supplying said winding member with alternating current, whereby the latter is caused to produce a moving magnetic field for cutting said inductor member, the action of one of said members being responsive to the force of gravity, and means for caging said latter member and said gyroscope rotor.

5. In a device of the character described, a gyroscope having a rotor arranged for turning about a vertical axis, a direct current motor for driving said rotor, an unbroken continuous electrical connection including spiral spring members for connecting said motor to an external direct current supply, and means acting, upon the tilting of said gyroscope rotor, to effect the precession of the same back to the vertical, said means comprising a stator member supplied with alternating current by taps taken off the armature of said motor, and a magnetically coupled inductor member, one of said members being controlled in its action by gravity, and the other of said members being carried by said gyroscope.

6. In a device of the character described, a gyroscope having a rotor arranged for turning about a vertical axis, a direct current motor for driving said motor, an unbroken continuous electrical connection including spiral spring members for connecting said motor to an external direct current supply, and means acting, upon the tilting of said gyroscope rotor, to effect the precession of the same back to the vertical, said means comprising a stator member supplied with alternating current by taps taken off the armature of said motor, and a magnetically coupled inductor member, one of said members being controlled in its action by gravity, and the other of said members being carried by said gyroscope, and means for simultaneously caging said gravity controlled member and said gyroscope.

7. A gyroscope particularly adapted for an artificial horizon or vertical, characterized by electromagnetic means including a pendulous member associated with the gyroscope and arranged, on angular displacement of the spin axis from the desired direction, to produce an erecting torque on the gyroscope, clamping jaws carried by said pendulous member for caging said gyroscope, and caging means including transversely movable caging fingers for operating said jaws and for simultaneously caging said pendulous member.

8. In a gyroscope of the character described, a gyro rotor bearing casing, a gimbal suspension for said casing, a pendulous member carried by said gimbal suspension and extending adjacent said casing, clamping jaws carried by said pendulous member for engaging and locking said casing, spring means for normally holding said jaws in released position, and manually operable caging fingers movable for engaging said clamping jaws and said pendulous member for effecting the locking of both the latter and said casing.

9. A gyroscope as defined in claim 8, wherein a turnable ring member, having said caging fingers pivotally mounted thereon, is employed for simultaneously moving said caging fingers toward or away from said pendulous member and the clamping jaws carried thereby.

10. In a gyro-vertical, a gyro rotor bearing casing, a gimbal suspension universally supporting said casing, a pendulous member also universally supported adjacent said casing, means for creating an interaction between said pendulous member and casing upon relative tilt of said member and casing for erecting the gyroscope, and a common means for caging both said casing and member.

11. In a gyro-vertical, a gyro rotor bearing casing, a gimbal suspension for said casing, a pendulous member also universally supported adjacent said casing, clamping jaws carried by said member for engaging and locking said casing, spring means for normally holding said jaws in released position, and manually operable caging fingers movable for engaging said clamping jaws and said pendulous member for effecting the locking of both said member and said casing.

WILLIAM ANSCOTT.
ORLAND E. ESVAL.